UNITED STATES PATENT OFFICE 2,435,551

PRODUCTION OF HYDROCARBONS FROM CARBON MONOXIDE AND HYDROGEN

James F. Black, Roselle, N. J., assignor to Standard Oil Development Company, a corporation of Delaware No Drawing. Application April 20, 1944, Serial No. 531,991

3 Claims. (Cl. 260—449.6)

The present invention relates to a process of synthesizing hydrocarbons from carbon monoxide and hydrogen.

The reaction between carbon monoxide and hydrogen is well known and has been carried out under various reaction conditions not only to produce hydrocarbons of more than one carbon atom per molecule but also, where steam is reacted in conjunction with the process, to produce oxygenated organic compounds as well. The reaction may be carried out under vacuum, atmospheric pressure or superatmospheric pressures, but in general for the production of hydrocarbons, and more particularly the production of normally liquid hydrocarbons, atmospheric pressures or slightly above are generally employed.

The reaction temperatures heretofore employed have been extremely critical, with variations as much as 5 to 10 degrees from a desired temperature causing considerable fluctuation in the type of products and yields of normally liquid hydrocarbons produced. Furthermore, this has been a difficult problem because of the fact that the reduction of carbon monoxide with molecular hydrogen is a highly exothermic reaction and is a considerable obstacle in effecting methods for its control. The catalysts employed are the usual Fischer-Tropsch catalysts such as, for example, mixtures of iron or cobalt with magnesia, thoria and the like.

It has now been discovered that a novel catalyst may be employed in accomplishing the reduction of carbon monoxide with molecular hydrogen without the necessity for such accurate temperature control measures since the novel catalyst for carrying out this type of reduction is not so sensitive to temperature changes as those catalysts heretofore employed for the process. The novel catalyst comprises a nickel chromite which may, if desired, be subjected to a reduction with hydrogen prior to its use in the synthesis reaction, although this is not necessary if it is desired for reasons of economy to employ the freshly prepared nickel chromite directly in the catalyst. Another method of identifying the catalyst is to consider it as a mixture of nickel oxide and chromium oxide. The catalyst may be prepared in a number of ways, one method of preparing the same being as follows:

Example 1

1163 grams of nickel nitrate crystals were dissolved in 3200 cc. of water and the solution brought to a temperture of about 165° F. Separately, 504 grams of ammonium dichromate were dissolved in 2400 cc. of water and to this there was added 550 cc. of concentrated ammonium hydroxide. This second solution was then added in a thin stream and with continued stirring to the nickel nitrate solution which was held at about 165° F. throughout the addition. The resultant precipitate was filtered, dried at 300° F. and heated to about 700° F., where it was calcined for about 1 hour. The resultant catalyst was then pilled and employed as the catalyst mass in the reduction of carbon monoxide with hydrogen in accordance with the examples hereinafter set forth.

Other methods may be employed to prepare the catalyst. Thus, for example, it is not necessary to employ nickel nitrate as the source of the nickel since the sulfate, chloride, carbonate and the like, of nickel may also be employed. Also, in place of using ammonium dichromate as the other component of the catalyst, chromic acid and ammonium hydroxide may be employed, ammonium chromate instead of ammonium dichromate may be used, and also the sodium and potassium chromates and dichromates may be employed. If desired, the catalyst may also be prepared from mixtures of nickel oxide and chromic oxide independently prepared and admixed. Various other modifications may be employed in the preparation of the nickel chromite. If the nickel sulfate is employed, special procedures may be instituted for insuring the removal of the last traces of the sulfate ion through the use of large quantities of ammoniacal chromate and with the repeated washing of the precipitate, including the re-dissolving of the same in admixture with chromic acid, dilution with distilled water and re-precipitation with aqueous ammonia. This procedure for the removal of sulfate is already known but since the catalyst is to some extent poisoned by the presence of sulfur, precautions should be taken, if nickel sulfate is employed, to remove as completely as possible any sulfate ions present in the precipitated catalyst.

Precautions should be taken to insure the removal of sulfur and sulfur compounds from the feed stocks employed in the hydrocarbon preparation. Suitable sources of supply of the feed stock include most any source of carbon monoxide and, likewise, any source of hydrogen. Suitable sources include water gas, gases obtained through the controlled hydrogenation of coal or by any other gasification of solid carbonaceous fuel such as coke, brown coal, mineral coal, etc., by the conversion of natural gas, by the reaction of methane with steam and/or carbon dioxide, or by subjecting hydrocarbon gases to controlled and incomplete combustions. Care should be taken, however, to treat these crude gaseous mixtures with caustic or with triethanolamine or other suitable basic acting materials to remove therefrom the sulfur and sulfur-containing products since they have a tendency to poison the catalyst in the subsequent conversion operation. Generally speaking, the ratio of molecular hydrogen to carbon monoxide should be adjusted between about 1.8:1 and about 2.5:1 on the volume basis, although equal volumes of hydrogen and carbon monoxide may be employed. The throughput in the reduction of carbon monoxide with molecular hydrogen in the catalyst chamber may range between about 50 and about 150 volumes of gas per volume of catalyst per hour, preferably between about 100 and about 135 volumes of gaseous synthesis mixture per volume of catalyst per hour.

Although it is not essential in securing excellent yields of hydrocarbons containing more than one carbon atom per molecule, the catalyst sometimes is benefited in its desired activity if it is oxidized and then reduced before being placed on stream. This procedure very often is helpful where the catalyst has begun to lose its initial activity after being on stream for some time. The controlled oxidation of the catalyst tends to free it from carbonaceous impurities such as high melting point paraffin wax and the like, and once it has been oxidized it is necessary that it be reduced again before being placed on stream. Fresh catalyst, on the other hand, need be only reduced with molecular hydrogen under controlled conditions to give a highly active catalytic material of metallic nickel and chromium. The conditions for the controlled reduction of the mixture of nickel oxide and chromium are well known and need not be repeated here.

*Example 2*

The catalyst prepared in accordance with the procedure outlined in Example 1 was reduced by passing in contact therewith about 2000 volumes of molecular hydrogen per volume of catalyst per hour at a temperature of about 760° F. for a period of about 5 hours. This catalyst was then placed in a reactor maintained at a temperature of about 360° F. and at a throughput of about 118 v./v./hr., and a mixture of molecular hydrogen and carbon monoxide in the volume ratio of about 1.97:1 was passed therethrough. There was obtained from this reaction a yield of about 179 cc. of normally liquid hydrocarbons per cm. measured under standard temperature and pressure conditions.

*Example 3*

A further batch of nickel chromite catalyst was made up in a manner similar to that stated in Example 1 and this was reduced with hydrogen passed at a rate of 2200 v./v./hr. at a temperature of 750° F. The catalyst was then placed on stream and contacted with a synthesis gas mixture of hydrogen and carbon monoxide in a volume ratio of about 2:1 at atmospheric pressure and at a feed rate varying between about 111 and about 113 v./v./hr. The temperature of the reactor varied between about 358° F. and about 363° F. and the run was carried out for a total of 97 hours. The yield varied after the first 25 hours of operation between about 132 and about 168 cc. of normally liquid hydrocarbons per cm. of synthesis gas measured under standard temperature and pressure conditions.

Various modifications may be made in carrying out the process of the present invention without departing from the scope thereof. Thus, for example, the nickel chromite need not be pelleted directly but it may be employed on a suitable carrier such as, for example, silica gel, alumina gel, diatomaceous earth, kieselguhr, activated charcoal or other suitable porous carrier. The incorporation of the nickel chromite into the carrier may be done in a number of ways. Thus, for example, the catalyst may be actually precipitated within the solution of the carrier by impregnating the nickel nitrate solution into the carrier, followed by the mixing in solution of the carrier with the suitable ammoniacal chromate component of the catalyst mass and then draining off excess solution, followed by the calcining of the catalyst impregnated carrier. The nickel chromite may likewise be coated on the various carrier particles and calcined and reduced as a coating on the carrier. Various other modifications in the use of this catalyst in conjunction with the reduction of carbon monoxide with molecular hydrogen may also be employed without departing from the spirit of the invention.

The nickel chromite prepared by calcination of the nickel ammonium chromate complex is suitable for use in "fluid" operation without further treatment. Catalysts of this type and their preparation are disclosed and claimed in my copending application, Serial No. 763,725, filed July 25, 1947. Nickel chromite or nickel oxide-chromium oxide catalysts prepared by other methods can be ground to a size suitable for "fluid" operation. The catalyst has also been found to fluidize readily when prepared on a suitable carrier such as silica gel, alumina, clay, bauxite, silica-alumina gels, kieselguhr, and other porous or gelatinous material.

Operation on a fluid basis may be carried out in any suitable apparatus. One such type is disclosed in application Serial Number 371,922 of Murphree et al., filed December 27, 1940, now U. S. Patent No. 2,360,787, issued October 17, 1944. Other types of catalytic apparatus may also be employed such as bed type catalytic reactors preferably provided with means for rapidly removing the exothermic heat of reaction such as tube bundles contacting a liquid medium which may be withdrawn from the reactor, cooled and returned to the reactor, cooling jackets, etc.

Having now fully described and illustrated the nature of the invention, what is desired to be secured by Letters Patent is:

1. The process for the production of hydrocarbons containing more than one carbon atom per molecule which comprises reacting carbon monoxide and hydrogen at a temperature of between about 300° and about 450° F. in the presence of a fluidized catalyst comprising nickel chromite prepared by combining at an elevated temperature under agitation an aqueous solution of a nickel salt with an ammoniacal solution of an ammonium chromate and separating, drying and calcining the precipitate formed.

2. The process for the production of hydrocarbons containing more than 1 carbon atom per molecule, which comprises reacting carbon monoxide and hydrogen at a temperature of between about 300°–450° F. in the presence of a fluidized catalyst, comprising reduced nickel chromite particles of fluidizable size prepared by a method consisting of combining an aqueous solution of a nickel salt with an ammoniacal solution of an ammonium chromate at an elevated temperature under agitation to form a precipitate, separating and drying the precipitate, and calcining the dry precipitate for an extended time to form directly said particles of fluidizable size.

3. The process of claim 2 in which said elevated temperature is about 165° F.

JAMES F. BLACK.

REFERENCES CITED

The following references are of record in the file of this patent:

UNITED STATES PATENTS

| Number | Name | Date |
|---|---|---|
| 1,984,380 | Odell | Dec. 18, 1934 |
| 1,964,000 | Lazier | June 26, 1934 |
| 2,180,672 | Frey | Nov. 21, 1939 |
| 2,245,157 | Pier | June 10, 1940 |
| 2,347,682 | Gunness | May 2, 1944 |